United States Patent [19]
Lindsley

[11] Patent Number: 6,137,199
[45] Date of Patent: Oct. 24, 2000

[54] ALTERNATOR WITH PERMANENT MAGNET ROTOR HAVING PRIMARY MAGNETS AND BLOCKING-POLE MAGNETS

[75] Inventor: Nathaniel Lindsley, Lebanon, Tenn.

[73] Assignee: Scout Technologies, Inc., Jeffersonville, Ind.

[21] Appl. No.: 09/346,390

[22] Filed: Jul. 1, 1999

Related U.S. Application Data

[63] Continuation-in-part of application No. 08/516,921, Aug. 18, 1995.

[51] Int. Cl.⁷ .............................. H02K 7/09; H02K 15/16
[52] U.S. Cl. .............................................. 310/74; 310/156
[58] Field of Search .................... 310/156, 152, 310/179, 214, 216, 268, 74, 181, 67 R, 70 A, 171; 123/599, 149 R; 29/596–598; 322/4, 48

[56] References Cited

U.S. PATENT DOCUMENTS

| | | | |
|---|---|---|---|
| 2,976,439 | 3/1961 | Kiekhaefer | 310/74 |
| 3,727,302 | 4/1973 | Phelon | 29/596 |
| 4,093,906 | 6/1978 | Draxler | 322/51 |
| 4,160,435 | 7/1979 | Sleder | 123/599 |
| 4,243,903 | 1/1981 | Mishima | 310/154 |
| 4,376,903 | 3/1983 | Mishima | 310/154 |
| 4,847,526 | 7/1989 | Takehara et al. | 310/185 |
| 4,873,962 | 10/1989 | Safranek | 123/599 |
| 5,473,298 | 12/1995 | Teutsch | 335/237 |
| 5,731,645 | 3/1998 | Clifton et al. | 310/74 |

*Primary Examiner*—Elvin Enad
*Assistant Examiner*—Tran Nguyen
*Attorney, Agent, or Firm*—Reed Smith Hazel & Thomas LLP

[57] ABSTRACT

A permanent magnet rotor alternator is disclosed having a one-piece, rotor hub\flywheel\starting gear. Three high remanence ceramic permanent magnets provide a rotor having a contiguous ring of twelve alternating poles which allows for higher alternator efficiency. The magnets are ceramic and are adhesively bound to the rotor hub, which is driven by an extended crankshaft. The rotor rotates within a wound stator assembly of which the laminated stator core is a part of the alternator's frame assembly, and thus, serves as a shield should a rotor magnet come loose.

22 Claims, 9 Drawing Sheets

ALTERNATOR WITH PERMANENT MAGNET ROTOR HAVING PRIMARY MAGNETS AND BLOCKING-POLE MAGNETS

This is a continuation-in-part application to Application No. 08/516,921, filed Aug. 18, 1995.

BACKGROUND OF THE INVENTION

1. Field of the Invention

The present invention relates generally to permanent magnet rotor alternators for internal combustion engines and more particularly to a permanent magnet rotor alternator wherein the rotor hub is an integral part of the flywheel/starting gear of the internal combustion engine.

2. Description of the Prior Art

Many automotive type alternators use wound stator and rotor assemblies. An electromagnetic force is produced in and around the rotor windings by admitting current through the rotor windings. As the magnetic field produced in the spinning rotor couples with the windings at the stator, current is induced in the stator windings. Alternators such as this require brushes or slip rings to maintain a closed circuit for admitting the current necessary m the rotor while it is spinning. These mechanical connections are vulnerable to wear and corrosion. Electrical noise is common as well, which may affect other sensitive electronics common to modern automobiles.

Permanent magnet rotor alternators do not require that a current be supplied to the rotor. The field inherent to, and generated by the magnetic material induces current in the stator as the magnet poles move in respect to the stator windings. Because current need not be supplied to the rotor, slip rings and brushes are not required. Hence, the noise and wear associated with these alternators employing these elements are eliminated.

It should be appreciated by those skilled in the art that, although traditional regulating means for wound rotor systems, e.g. control of field current in rotor windings, are not applicable to permanent magnet rotor alternators, other means, such as those implementing bipolar SCR devices, a bridge rectifier, and associated circuitry have been employed efficiently and reliably. Regulation is achieved by shorting the output current so as to not exceed the system requirements, while at the same time assuring that the battery does not become short circuited.

Permanent magnet rotor alternators and magnets have been used successfully for many years in small industrial engines and marine applications. While the rotor is often an integral part of a flywheel/starting gear, the prior art systems have several drawbacks. Typically, a cup-shaped rotor assembly is used. Individual magnets are attached to the "cup" at the inner rim, and an annular gear is welded or press-fit to the outer rim for allowing the gear to be driven by a starting motor. In systems such as this, the stator is internal to the rotor assembly, thereby leaving the external spinning rotor assembly exposed. This arrangement is bulky and presents potential hazards should a magnet become loose when spinning at high rpm. The loss of a magnet could make the system dynamically unstable as well. An additional shroud may be used to protect against a projected magnet, but a shroud adds to the bulk, expense, and complexity of the system. Examples of patented prior art devices may be seen in U.S. Pat. No. 4,345,553 (Magrane et al); U.S. Pat. No. 3,955,550, (Carlsson); U.S. Pat. No. 3,140,413, (Terry et al.); U.S. Pat. No. 2,976,439, (Kiekhaefer); U.S. Pat. No. 2,856,550 (Phelon).

SUMMARY OF THE INVENTION

It is therefore an object of the present invention to provide an improved permanent magnet rotor alternator.

A further object of this invention is to provide an improved permanent magnet rotor alternator in which the rotor hub is an integral part of the flywheel/starting gear of an internal combustion engine.

It is another object of this invention to provide an improved permanent magnet rotor alternator of reduced complexity.

It is yet another object of this invention to provide an improved permanent magnet rotor alternator of greater inherent safety.

It is still another object of this invention to provide an improved permanent magnet rotor alternator with improved efficiency.

Briefly, these and other objects may be achieved by an alternator system with a permanent magnet rotor and wound stator, one-piece, flywheel/starting gear rotor assembly, utilizing three high remanence ceramic permanent magnets, each magnet being magnetized with four alternating poles, and being adhesively bound to a rotor hub in an abutting relationship to create a continuous ring of twelve alternating poles, and an external wound stator comprising a laminated core being part of a frame assembly which is secured directly to the engine block of an internal combustion engine.

Other objects and features of the present invention will be apparent from the following detailed description of the preferred embodiment.

BRIEF DESCRIPTION OF THE DRAWING

The invention will be further described in conjunction with the accompanying drawings, in which.

DETAILED DESCRIPTION OF THE PREFERRED EMBODIMENT

Figure 1:
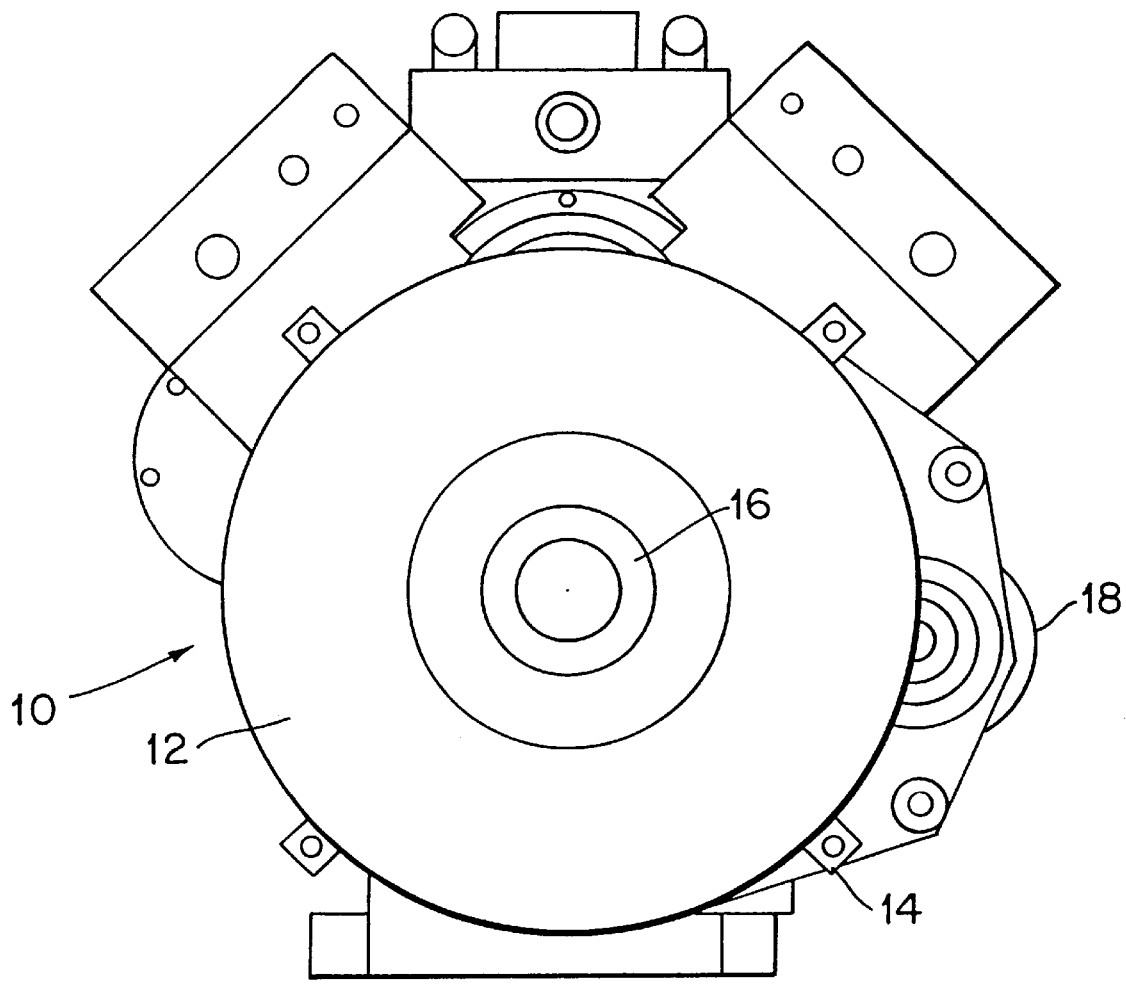
FIG. 1 is a rear view of a small internal combustion engine with a permanent magnet rotor alternator constructed in accordance with a preferred embodiment of the invention attached thereto.

With reference to the figures, wherein like reference numbers indicate like elements throughout the several views and, in particular, with reference to FIG. 1, a rear view of a small industrial internal combustion engine is depicted having a permanent magnet rotor alternator 10, according to the invention. Further depicted are end frame 12, tabs 14, driving boss 16, and starting motor 18. Alternator 10 is fixedly attached to the engine block (not shown). The rotor assembly of alternator 10 is driven by the engine's crankshaft (not shown). The crankshaft is extended axially from the engine to engage a rotor hub 20, which is an integral part of the engine's flywheel/starting gear. These features will be further described with reference to figures more revealing of these features.

Figure 2:
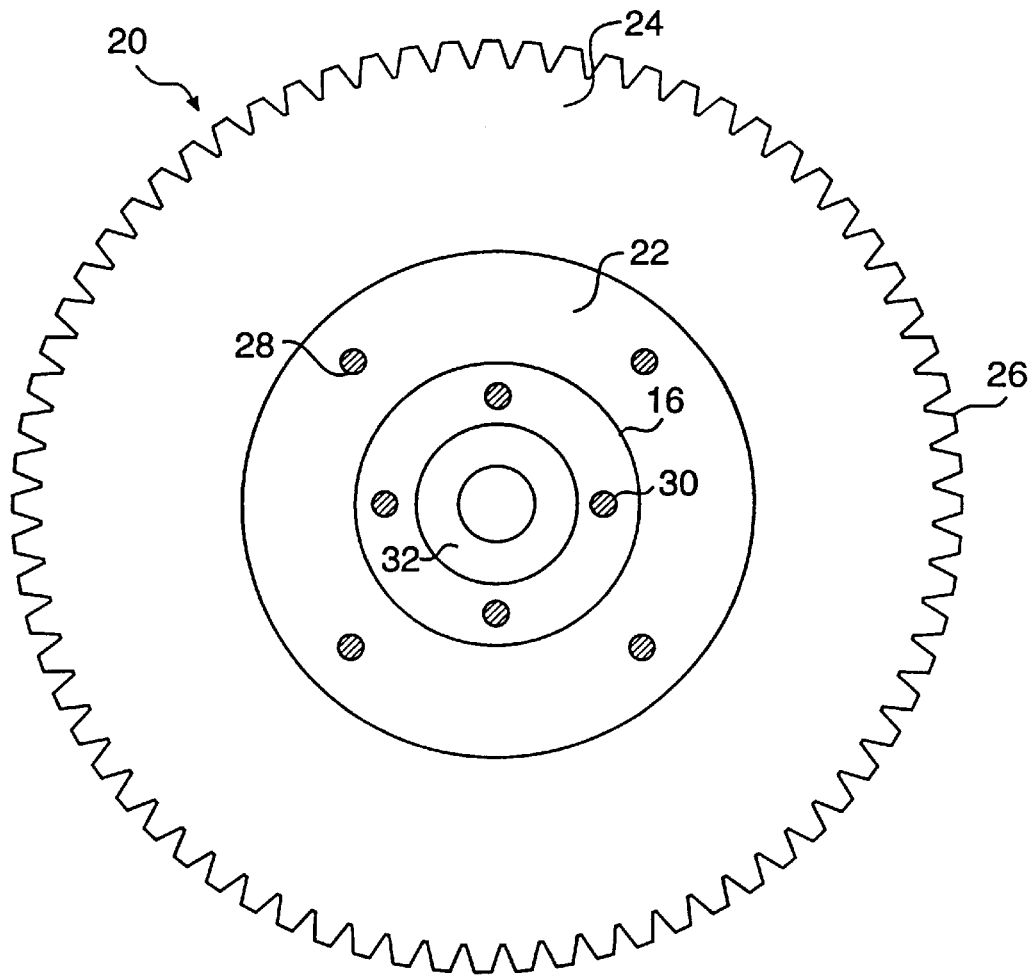
FIG. 2 is a rear view of the integrated rotor hub in accordance with a preferred embodiment of the invention.
Figure 3:
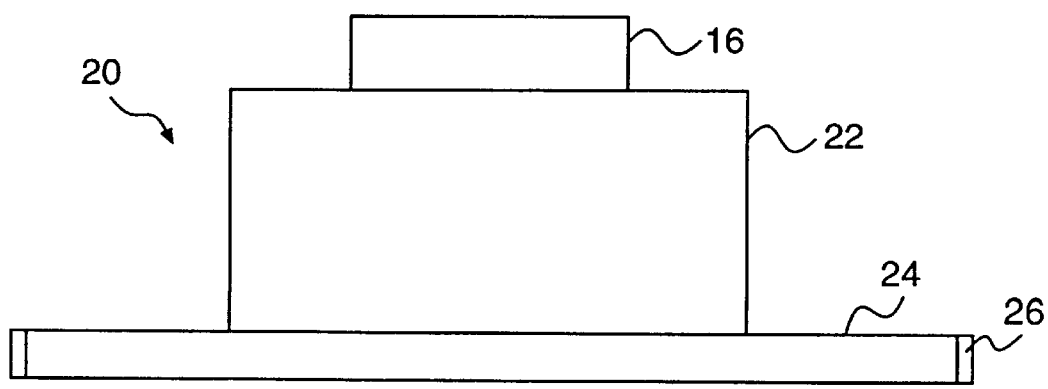
FIG. 3 is a side view of the integrated rotor hub in accordance with a preferred embodiment of the invention.
Figure 9:
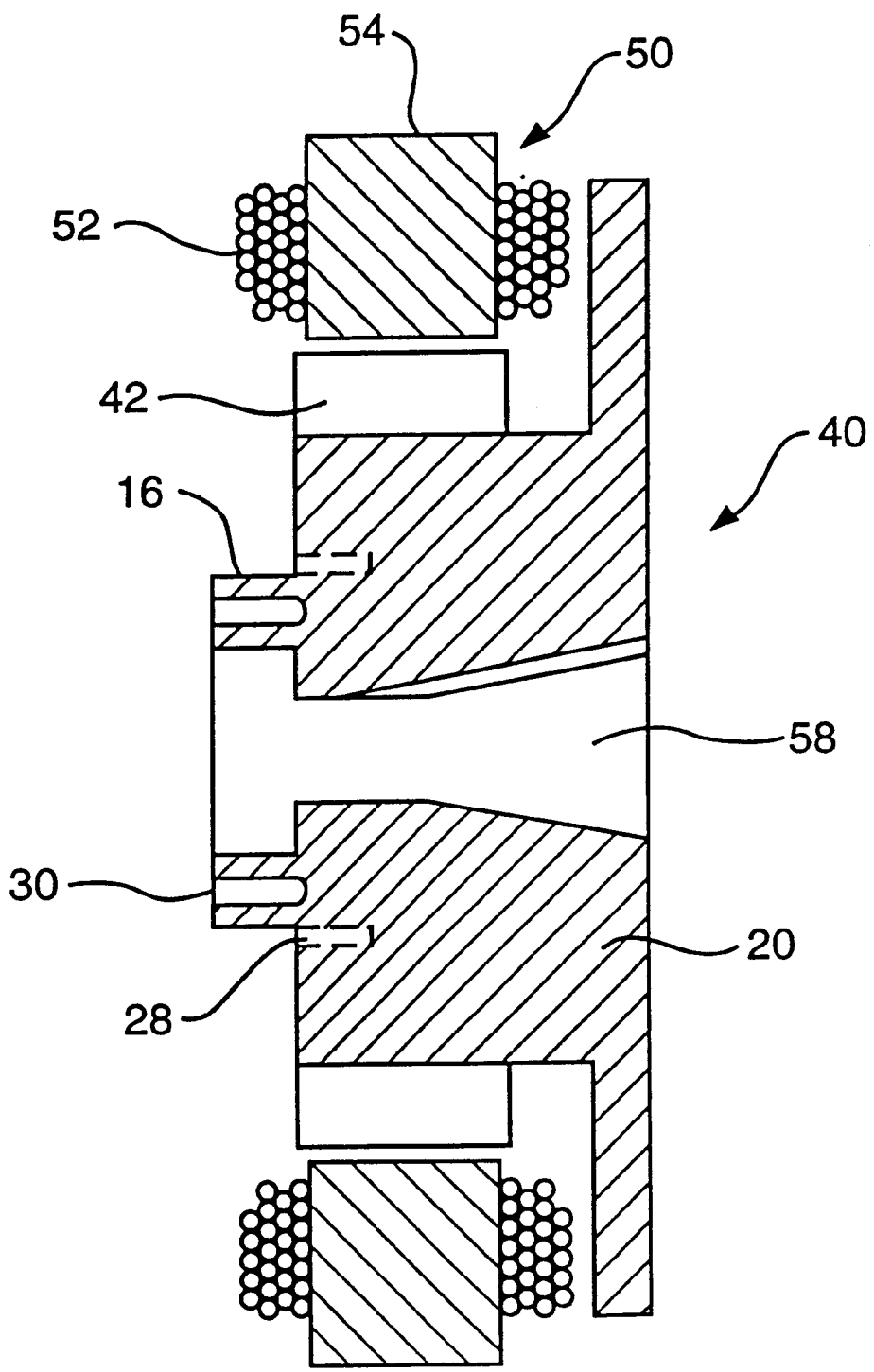
FIG. 9 is a cross-sectional view of the rotor and stator assemblies in concentric relation in accordance with a preferred embodiment of the invention.

Referring now to FIGS. 2 and 3, rear and side views, respectively, of the one-piece rotor hub/flywheel/starting gear are depicted. This integrated component of alternator 10 will, from this point forward, be referred to simply as hub 20. Hub 20 has two cylindrical features which distinguish it from an ordinary flywheel/starting gear. First, extrusion 22 of hub 20 extends axially from flywheel 24. Flywheel 24 has gear teeth 26 allowing flywheel 24 to serve as a starting gear. Second, driving boss 16, as previously mentioned, extends axially from extrusion 22. Use of the term "extrusion" is not meant to describe a manufacturing process, but rather, is merely meant to suggest a geometrical relation. It is important to realize that although flywheel 24, gear teeth 26, extrusion 22 and driving boss 16 are indicated separately, they are all features integral to one-piece hub 20. Additionally, they are symmetrical about, and centered along a single axis which is common to the crankshaft extension. Also shown are screw holes 28 to allow coupling of a cooling fan which will be later shown. Driving boss 16 is drilled and tapped to create threaded holes 30, allowing for a load member to be attached to hub 20 for any number of industrial applications. The center of driving boss 16 is counter bored, as shown in FIG. 9 at location 32. Throughout the depth of extrusion 22, hub 20 is machined to allow for the crankshaft extension, which is tapered and keyed, to securely mate to hub 20. The end of the extended crankshaft is threaded to allow a nut to secure hub 20 to the crankshaft's threaded portion which extends into the counter bored portion of driving boss 16.

Figure 4:
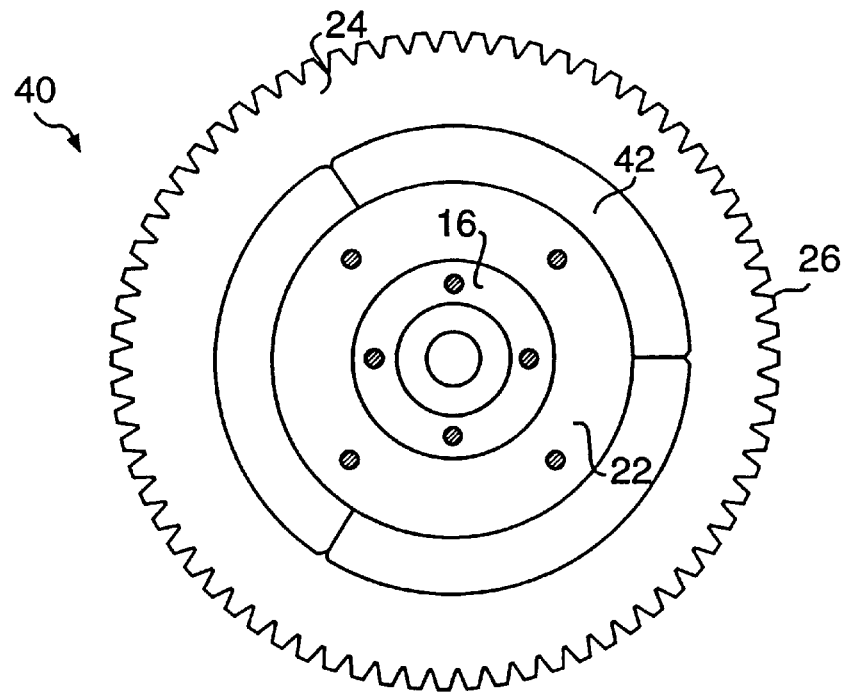
FIG. 4 is a rear view of the integrated rotor hub with permanent magnets adhesively attached in accordance with a preferred embodiment of the invention.
Figure 5:
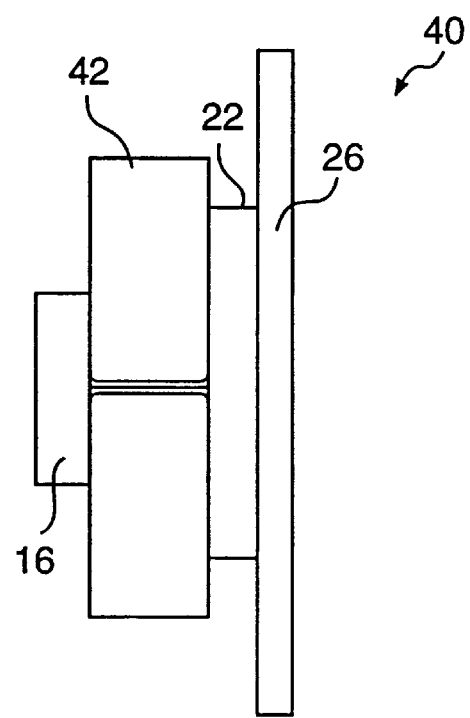
FIG. 5 is a side view of the integrated rotor hub with permanent magnets adhesively attached in accordance with a preferred embodiment of the invention.

Referring now to FIGS. 4 and 5, which depict rear and side views, respectively, of a complete rotor assembly 40, three permanent magnets, 42, are shown attached around hub 20. Specifically, the magnets are set in a plane, around extrusion 22, which is remote from flywheel 24. Hub 20 is made of a mild steel and has sufficient mass so as not to saturate, with regard to magnetic flux, and therefore allows for a low reluctance flux path for the resulting magnetic field. In this embodiment, magnets 42 may be Ferrimag 8A ceramic permanent magnets available from Crucible Magnetics of Elizabethtown, Ky., or any commercially available high remanence magnet. High remanence magnets are appropriate for applications where the magnets may be subjected to excessive vibrations and shocks because the magnets' flux intensity is not likely to be decreased. Magnets 42 are bound to hub 20 with a structural adhesive. Some adhesives suitable for this application are ELMS 702-98, available from Engineering Systems Inc. of Worthington, Ohio, and Loctite 334, available from Loctite Corporation of Rocky Hill, Conn. Adhesives are used because they provide exceptional strength as well as excellent resistance to humidity, salt spray and chemicals. Also, these adhesives are not likely to succumb to heat stress at high temperatures and, therefore, they provide a secure means of attachment. The use of adhesives, rather than a more elaborate mechanical coupling means, simplifies the manufacturing process and reduces the number of parts in the system, thus lowering costs.

Figure 6:
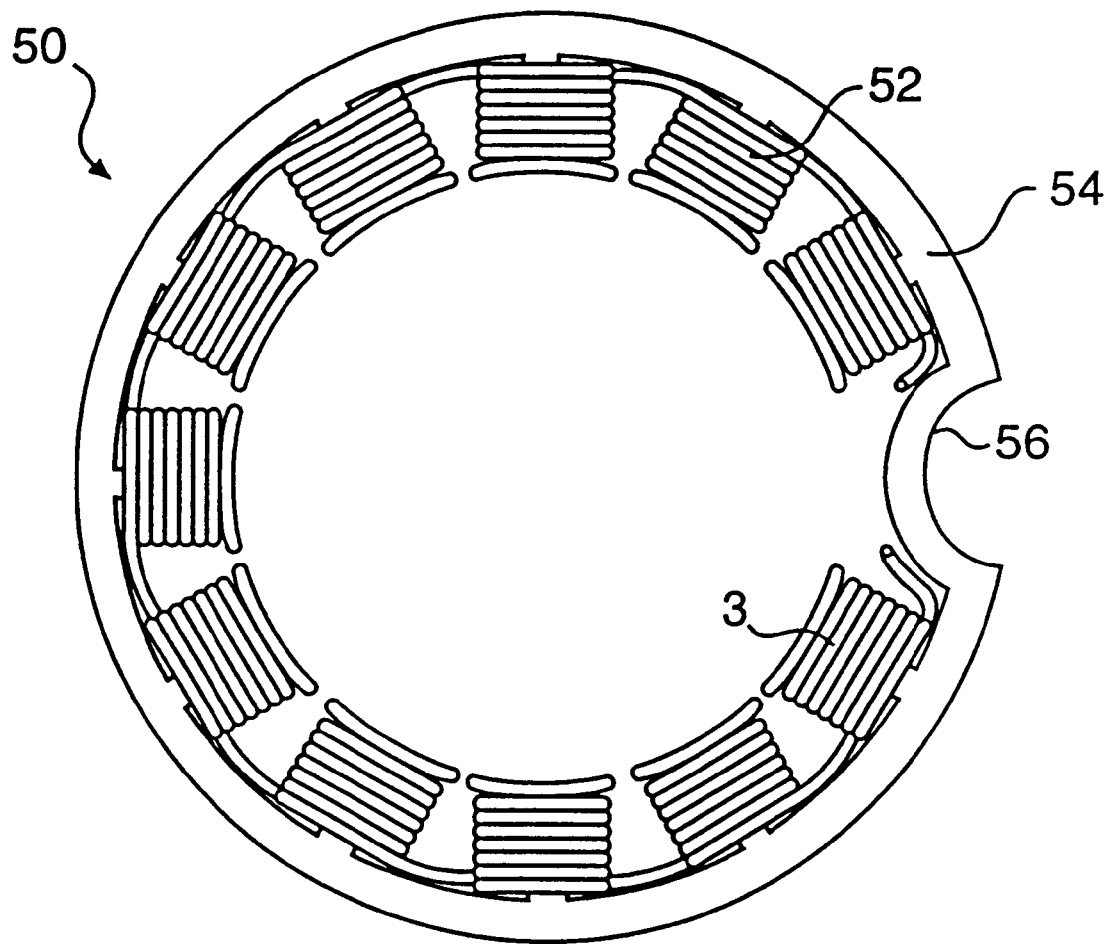
FIG. 6 is a view of the stator assembly in accordance with a preferred embodiment of the invention.

Referring now to FIG. 6, a view of a stator assembly 50, is depicted as it would appear prior to placement over magnets 42. Stator assembly 50 has a continuously wound single stator circuit forming eleven stator poles 52, and a laminated core 54. The present embodiment employs #14 size magnet wire wound 25 turns around each of eleven stator poles. The direction of the turns reverses from one stator pole to the next. The reversal in pole winding is necessary because at the instant a magnet's polarity changes with respect to a given stator pole, adjacent stator poles experience the opposite change in magnetic polarity and, therefore, the current induced in one stator pole is in the opposite direction to the current induced in the adjacent stator poles. If the windings were in the same direction, the opposing currents would create a null field. It should be obvious to those skilled in the art that two or more stator circuits could be used such that the winding direction is arbitrary so long as the currents are added properly. Finished windings are epoxy coated and cured providing structural integrity and electrical isolation, adding to the security of the overall system. Laminated core 54 is comprised of 35 pieces of M19C5 electrical steel, each laminate being 0.875 inches or 2.22 cm thick. A further feature of core 54 is an arched intrusion 56, which sacrifices a twelfth stator pole. Arched intrusion 56 allows room to accommodate the pinion gear of starter 18 (not shown) when not engaging gear teeth 26. In other words, the pinion gear is stored in this area.

Figure 7:
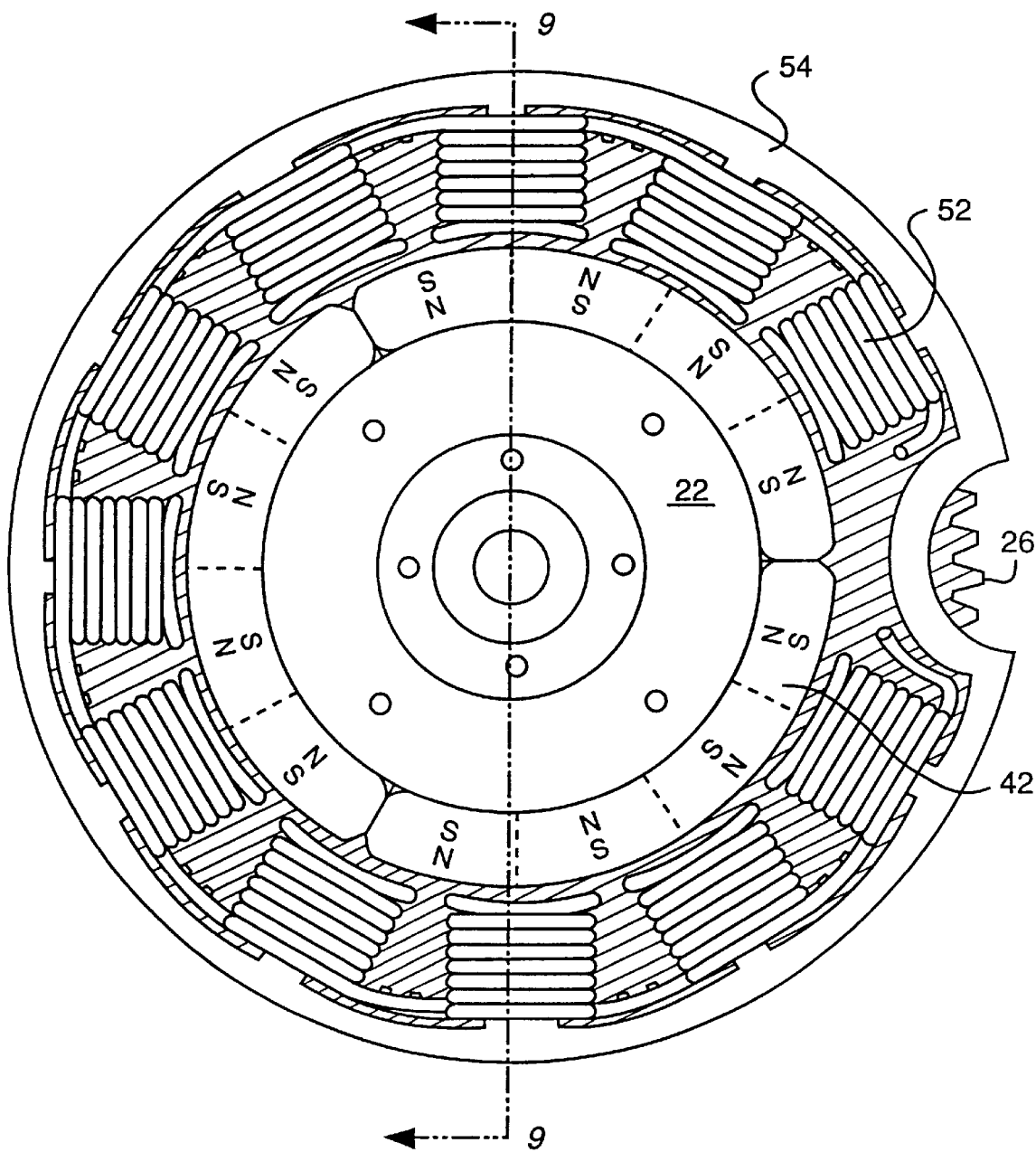
FIG. 7 is a view of the rotor and stator assemblies in concentric relation in accordance with a preferred embodiment of the invention.
Figure 8:
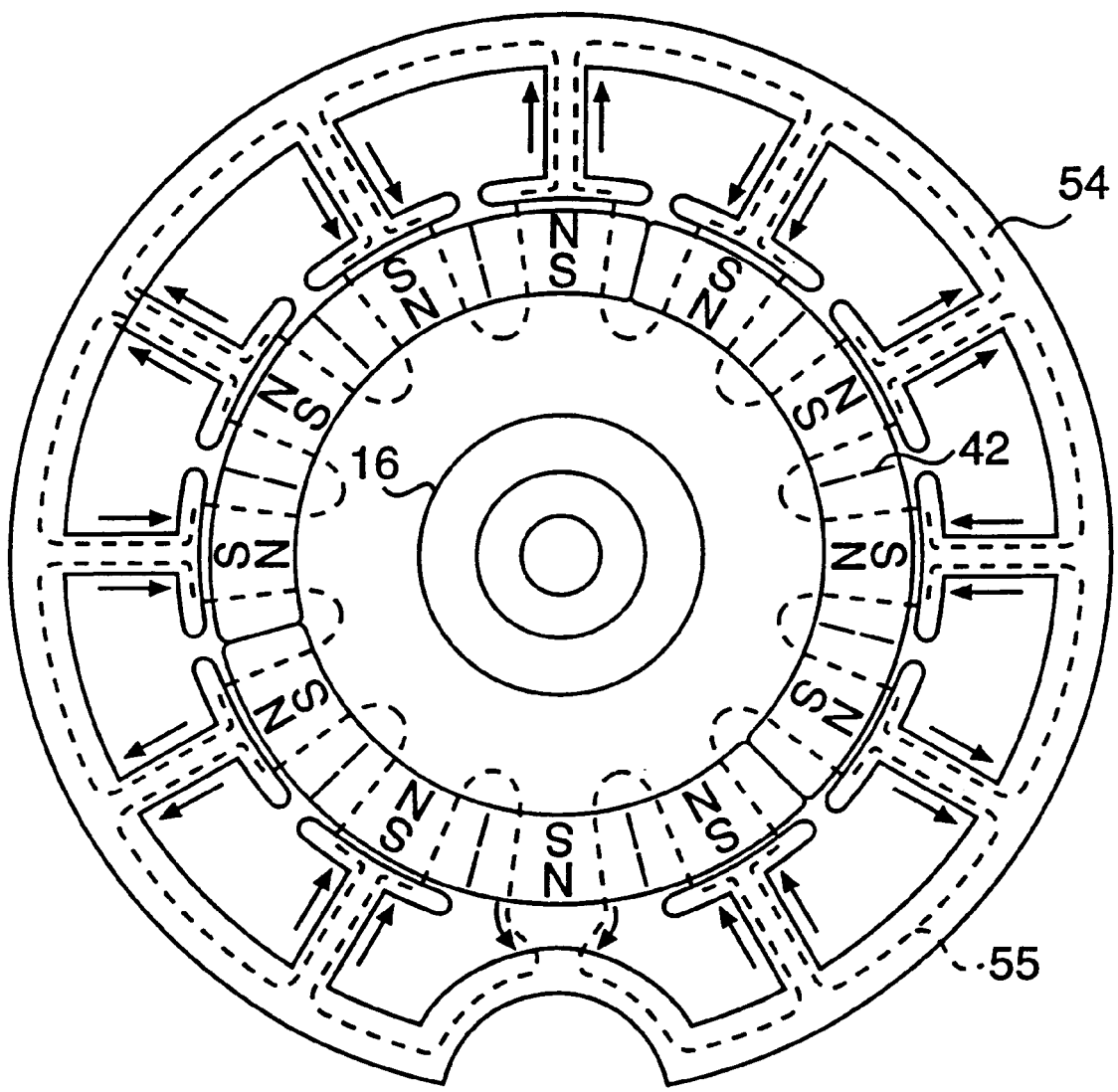
FIG. 8 is a view of the rotor and lamination stack in accordance with a preferred embodiment of the invention, indicating flux direction.

FIG. 7 depicts a view of stator assembly 50 and rotor assembly 40 in proper concentric relation. Magnets 42 are shown indicating how they are polarized. Namely, each of the three magnets 42, are magnetized with four alternating poles, NS-SN-NS-SN. The three magnets combined create twelve poles of alternate polarity. To minimize flux losses, in this instance, a gap no greater than 0.030 inches or 0.076 cm is maintained between magnets 42, and stator poles 52. Also, because magnets 42, are arranged radially about extrusion 22 to form a continuous ring of alternating polarity, no reduction in flux intensity is experienced between each of magnets 42 resulting in higher alternator efficiencies. Prior art systems use separated, individual magnets, usually having ferrous material between each magnet. Because the ferrous material has some reluctance, the flux intensity from one magnet to another is reduced significantly before changing polarity. FIG. 8 depicts the direction of flux in the rotor assembly and the stator assembly as indicated by the arrows and the dashed lines 55. For clarity, the stator windings are not shown.

Referring now to FIG. 9, a cross-sectional view of stator assembly 50 and rotor assembly 40 are shown, in proper concentric relation, through the axis of hub 20. It can be seen that hub 20 is machined for the tapered, keyed, and threaded crankshaft extension as previously mentioned. These features are clearly seen in the cross-section generally indicated at location 58. Also depicted are magnets 42, screw holes 28, and threaded holes 30.

Figure 10:
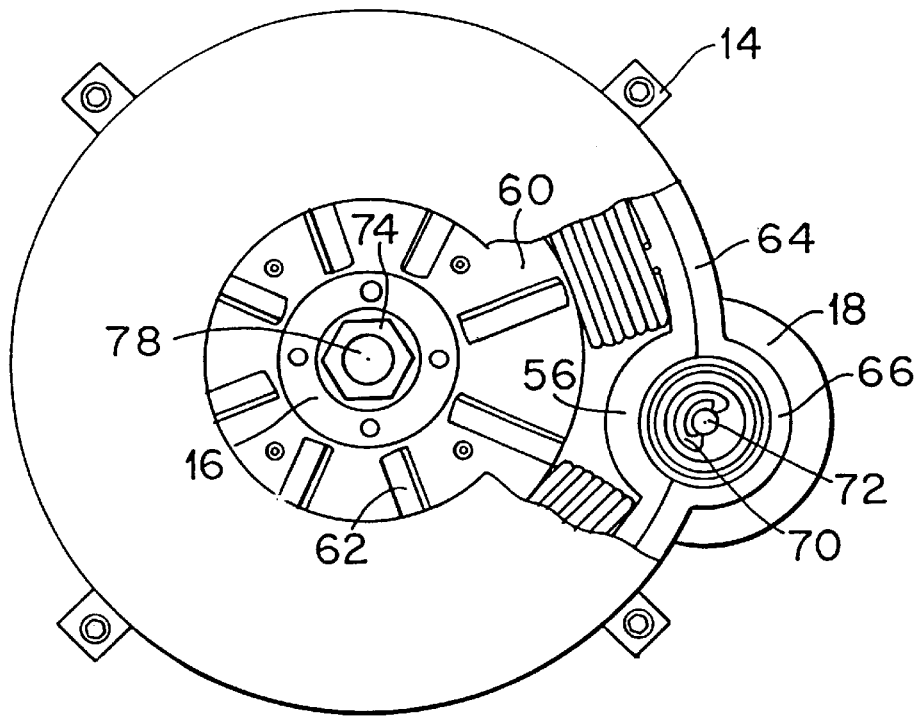
FIG. 10 is a rear view of the permanent magnet rotor alternator in accordance with a preferred embodiment of the invention.

FIG. 10 depicts the rear view of alternator 10. Shown is a partial cutaway of end frame 12. Cooling fan 60, having eight fan blades 62, is shown attached to hub 20. Spacer ring 64 is likewise exposed and is circular but for a protrusion 66. Spacer ring 64 is vented (venting not shown) to allow the air being drawn through alternator 10 by fan 60 to be exhausted. Starting motor 18, pinion gear 68, pinion retaining ring 70, and pinion shaft 72 are shown. Pinion gear 68 is positioned within intrusion 56 and protrusion 66. When starting motor 18 is energized, pinion 68 is drawn forward to engage gear teeth 26. A nut 74 is shown fastened to the threaded end 78 of crankshaft 76 to secure rotor assembly 40 to the crankshaft.

Figure 11:
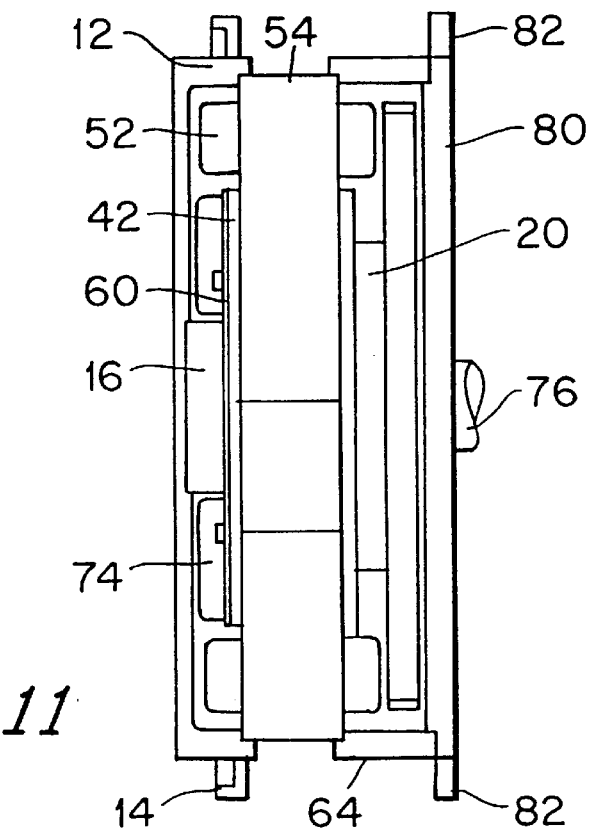
FIG. 11 is, generally, a side view of the permanent magnet rotor alternator in accordance with a preferred embodiment of the invention.

Referring now to FIG. 11, which generally depicts a side view of alternator 10, fan 60, stator poles 52, end frame 12, spacer ring 64, and a front end frame 80, are shown in an off-center cross-section to reveal more of the internal components than a profile could reveal. End frame 12 mates to laminated core 54, which, in turn, mates to spacer ring 64, which, in turn, mates to front end frame 80. The entire assembly is secured by bolts placed through holes in tabs 14 and screwed into threaded holes in front end frame tabs 82. This arrangement allows for alternator 10 to be completely disassembled and reassembled, if necessary, quickly and easily.

Figure 12:
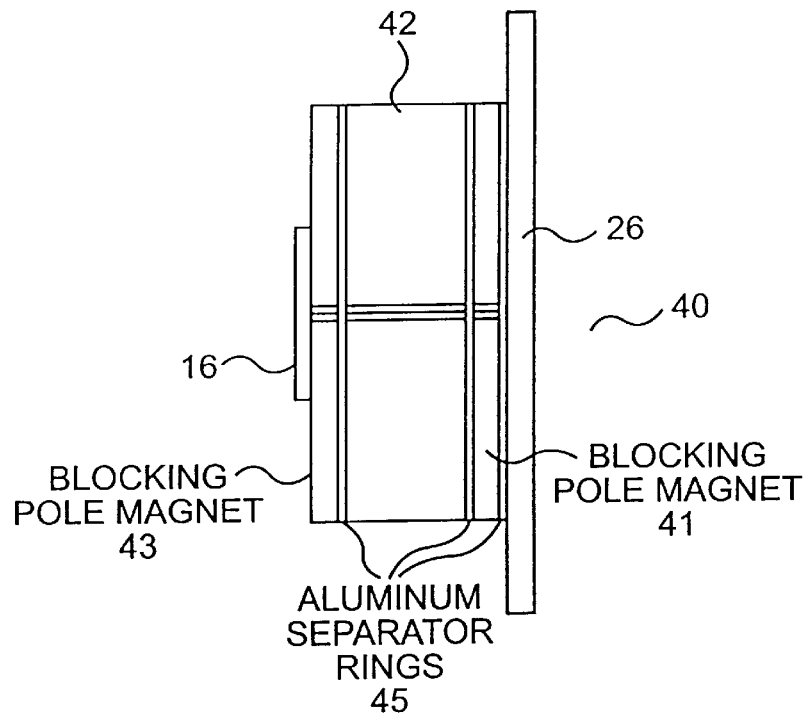
FIG. 12 is a side view of further embodiment of the integrated rotor hub.
Figure 13:
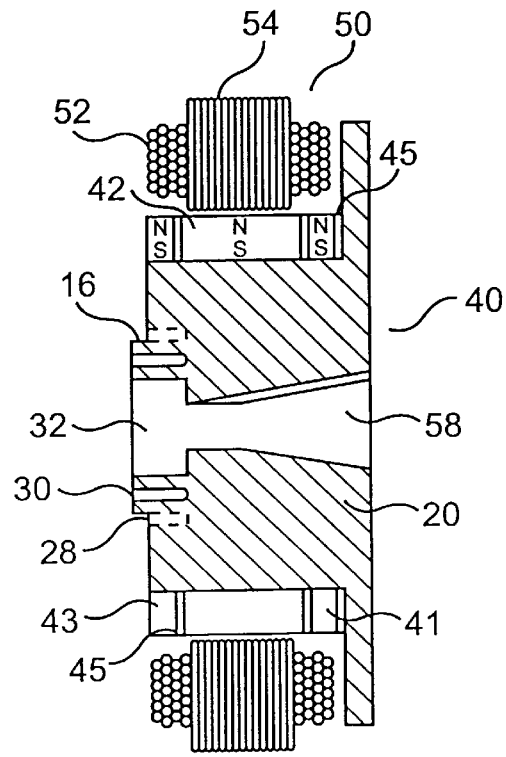
FIG. 13 is a side cross-sectional view of the integrated rotor hub according to the further embodiment of the present invention.

In a further embodiment of the present invention, FIGS. 12 and 13 show the structure of the hub 20 having, in addition to the three permanent magnets 42, three corresponding inner blocking pole magnets 41 and three outer blocking pole magnets 43, which are separated from the permanent magnets 42 and the flywheel 24 by three aluminum separator rings 45. FIG. 13 is a side cross-sectional view of the integrated rotor hub according to this further embodiment of the present invention.

As shown, the blocking pole magnets 41,43 are identical to the primary magnets 42, except for their thicknesses, and arranged with like poles adjacent with the primary magnets 42. The blocking pole magnets 41,43 are arranged so as to force leakage and fringing fluxes back to the primary flux path of the primary magnets 42, thereby increasing the strength of the flux field that cuts the stator windings. The efficiency in current output is thus increased in a direct ratio thereto.

The aluminum separator rings 45 are positioned between the primary magnets 42 and the inner blocking pole magnets 41, between the primary magnets 42 and the outer blocking pole magnets 43, and between inner blocking pole magnets 41 and the flywheel 24, respectively. The separator rings serve to implement the desired magnetic effect as noted above. In addition, by using the separator rings as additional surfaces on which adhesives may be placed for securing both the primary magnets 42 and the blocking pole magnets 41,43, the magnets are thus bonded to one another and to the hub 20 along more than one plane.

As with the first embodiment, all the magnets 41,42,43 may be Ferrimag 8A ceramic permanent magnets or other commercially available equivalents, bonded to the hub 20 via suitable adhesives that are resistant to humidity, salt spray, chemicals, and heat stress at high temperatures.

Although the present invention has been fully described in connection with the preferred embodiment thereof, with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An alternator for supporting a DC electrical system of an internal combustion engine, comprising:
    a rotor assembly for producing an alternating current of high magnitude and low voltage, said rotor assembly having a cylindrical hub integrally formed with a flywheel, said flywheel being formed at a first end of said cylindrical hub and concentric with a longitudinal axis of said cylindrical hub, a plurality of primary permanent magnets fixedly mounted on an outer surface of said cylindrical hub toward a second end thereof opposite said flywheel, wherein said permanent magnets being operatively positioned so as to generate a continuous ring of alternating high flux density magnetic field along a primary flux path, a plurality of blocking pole permanent magnets fixedly mounted on the outer surface of said cylindrical hub and adjacent said plurality of primary magnets, and means for operatively connecting said first end of said rotor assembly to a crankshaft of an internal combustion engine such that an axis of rotation of said crankshaft is coincident with said longitudinal axis of said cylindrical hub; and
    a stator assembly having a cylindrical core, a plurality of stator poles fixedly formed along a cylindrical inner surface of said core, and a stator winding circuit wound through said plurality of stator poles, wherein
    said stator assembly is operatively positioned with said rotor assembly such that said primary magnets of said rotor assembly are rotatively aligned with and surrounded by said stator poles of said stator assembly,
    said primary magnets are operatively positioned so as to generate a continuous alternating high flux density magnetic field along a primary flux path, and
    said blocking pole magnets are operatively positioned so as to force leakage and fringing fluxes into the primary flux path.

2. An alternator according to claim 1, wherein each of said plurality of primary and blocking pole magnets is magnetized with a plurality of alternating poles.

3. An alternator according to claim 1, wherein each of said plurality of primary and blocking pole magnets is formed from a high remanence permanent magnet.

4. An alternator according to claim 1, wherein said stator winding circuit is formed from a single continuous winding wound around each of said plurality of stator poles.

5. An alternator according to claim 1, wherein said stator winding circuit is formed from windings around each of said plurality of stator poles being wound in a direction opposite windings around stator poles adjacent thereto.

6. An alternator according to claim 1, wherein said cylindrical core is a laminated metallic core.

7. An alternator according to claim 1, wherein said rotor assembly further includes means for fixedly connecting a load member onto said second end of said cylindrical hub.

8. An alternator according to claim 1, wherein said cylindrical hub is formed from a magnetic material selected so as to provide a low reluctance magnetic flux path for a magnetic field generated by said rotor assembly.

9. An alternator according to claim 8, wherein said cylindrical hub is formed from steel so as to provide the low reluctance magnetic flux path.

10. An alternator according to claim 1, wherein said plurality of blocking pole magnets includes first and second groups of blocking pole magnets, said first group of blocking pole magnets is fixedly mounted adjacent said primary magnets toward the second end of said cylindrical hub opposite said flywheel, and said second group of blocking pole magnets is fixedly mounted adjacent said primary magnets between said primary magnets and said flywheel.

11. An alternator according to claim 10, wherein said plurality of blocking pole magnets further includes first, second and third separator rings fixedly positioned between said primary magnets and said first group of blocking pole magnets, between said primary magnets and said second group of blocking pole magnets, and between said second group of blocking pole magnets and said flywheel, respectively.

12. An alternator according to claim 11, wherein said first and second separator rings are formed from aluminum.

13. A rotor device for producing an alternating current of high magnitude and low voltage for supporting a DC electrical system of an internal combustion engine, comprising:

a cylindrical hub;

a flywheel integrally formed with said cylindrical hub, said flywheel being formed at a first end of said cylindrical hub and concentric with a longitudinal axis of said cylindrical hub;

a plurality of permanent magnets fixedly mounted on an outer surface of said cylindrical hub toward a second end thereof opposite said flywheel, said permanent magnets being operatively positioned so as to generate a continuous ring of alternating high flux density magnetic field along a primary flux path;

a plurality of blocking pole permanent magnets fixedly mounted on the outer surface of said cylindrical hub adjacent said plurality of primary magnets and operatively positioned so as to force leakage and fringing fluxes into the primary flux path; and means for operatively connecting said first end of said cylindrical hub to a crankshaft of an internal combustion engine such that an axis of rotation of said crankshaft is coincident with said longitudinal axis of said cylindrical hub.

14. A rotor device according to claim 13, wherein each of said plurality of permanent magnets is magnetized with a plurality of alternating poles.

15. A rotor device according to claim 13, wherein each of said plurality of permanent magnets is formed from a high remanence permanent magnet.

16. A rotor device according to claim 13, further comprising means for fixedly connecting a load member onto said second end of said cylindrical hub.

17. A rotor device according to claim 13, wherein said plurality of permanent magnets are fixedly mounted to said cylindrical hub with an adhesive.

18. An alternator according to claim 13, wherein said cylindrical hub is formed from a magnetic material selected so as to provide a low reluctance magnetic flux path for a magnetic field generated by said rotor assembly.

19. A rotor device according to claim 18, wherein said cylindrical hub is formed from steel so as to provide the low reluctance magnetic flux path.

20. An alternator according to claim 13, wherein said plurality of blocking pole magnets includes first and second groups of blocking pole magnets, said first group of blocking pole magnets is fixedly mounted adjacent said primary magnets toward the second end of said cylindrical hub opposite said flywheel, and said second group of blocking pole magnets is fixedly mounted adjacent said primary magnets between said primary magnets and said flywheel.

21. An alternator according to claim 20, wherein said plurality of blocking pole magnets flirter includes first, second and third separator rings fixedly positioned between said primary magnets and said first group of blocking pole magnets, between said primary magnets and said second group of blocking pole magnets, and between said second group of blocking pole magnets and said flywheel, respectively.

22. An alternator according to claim 21, wherein said first, second and third separator rings are formed from aluminum.

* * * * *